United States Patent [19]

Hirosawa

[11] Patent Number: 4,684,979

[45] Date of Patent: Aug. 4, 1987

[54] SYSTEM FOR ALLOCATING IMAGES ONTO PHOTOSENSITIVE MATERIALS UTILIZING FLAGS

[75] Inventor: Makoto Hirosawa, Kyoto, Japan

[73] Assignee: Dainippon Screen Mfg. Co., Ltd., Kyoto, Japan

[21] Appl. No.: 625,782

[22] Filed: Jun. 26, 1984

[30] Foreign Application Priority Data

Sep. 13, 1983 [JP] Japan ................................ 58-168862

[51] Int. Cl.⁴ ........................ H04N 1/46; H04N 1/343
[52] U.S. Cl. ...................................... 358/75; 358/78; 358/76; 358/287
[58] Field of Search .................. 358/75, 76, 77, 78, 358/79, 287, 280, 256

[56] References Cited

U.S. PATENT DOCUMENTS

| | | | |
|---|---|---|---|
| 4,189,741 | 2/1980 | Klopsch | 358/76 |
| 4,285,009 | 8/1981 | Klopsch | 358/76 |
| 4,327,380 | 4/1982 | Yamada et al. | 358/287 |
| 4,338,636 | 7/1982 | Yamada et al. | 358/75 |
| 4,470,074 | 9/1984 | Yamada | 358/287 |

FOREIGN PATENT DOCUMENTS 2057222 3/1981 United Kingdom .
2088671 6/1982 United Kingdom .

Primary Examiner—James J. Groody
Assistant Examiner—Robert M. Bauer
Attorney, Agent, or Firm—Lowe Price Leblanc Becker & Shur

[57] ABSTRACT

Performance of an image allocation process on a photosensitive film is observed on a display as a simulation image by an operator who manipulates it and a flag is included in the record of each image to indicate whether or not the corresponding image has been recorded.

5 Claims, 5 Drawing Figures (a)

(b)

(c)

SYSTEM FOR ALLOCATING IMAGES ONTO PHOTOSENSITIVE MATERIALS UTILIZING FLAGS

FIELD OF THE INVENTION

This invention relates to a system for allocation of images to be reproduced onto a sheet of photosensitive materials by means of an electro-optical scanning apparatus, particularly to a system for recording images corresponding to a plurality of originals on a comparatively large sized sheet of photosensitive materials, with efficiently using the sheet.

BACKGROUND OF THE INVENTION

Japanese Utility Model Publication No. 50-13443 (Japanese Utility Model Reg. No. 1,110,594) shows that the exposed area of a photosensitive material is indicated by measuring the horizontal distance between the position of the recording head which advances in the horizontal direction as scanning proceeds and the recording start point or the end point. The apparatus disclosed in the publication enables to measure the exposed area only in the horizontal direction, hence the remaining non-exposed area, on a sheet of photosensitive materials.

Japanese Patent Publication No. 52-18601 shows that image frames for respective color separation images are vertically allocated on a sheet of photosensitive materials, and that the color separation, e.g., for Yellow, Magenta, Cyan and Black is made so as to record respective separation images with coinciding with the image frames. Also, in this method the horizontal position of a recording head relative to a photosensitive material is detected and the exposed area, hence the remaining non-exposed area, of the sheet is measured only in the horizontal direction.

It will be advantageous for promoting the operating efficiency of electro-optical scanning apparatus that color separation images are arranged on a comparatively large sized sheet of photosensitive materials so as to utilize the whole area in which reproduction images are fully allocated not only in the horizontal direction, but also in the vertical direction and or in the matrix.

In view of the above prior arts, none of them is suitable for promoting the operating efficiency of scanning apparatus, and it is impossible with the prior art structures to measure the exposed area, hence the remaining non-exposed area, of the whole range of the photosensitive material. In order to record reproduction images on a photosensitive material in such a manner as above, the recording point must be detected in the horizontal direction (hereinafter defined as the subscanning direction) as well as in the vertical direction (hereinafter defined as the main scanning direction). In prior arts as mentioned above, it is impossible to measure the exposed area in the main scanning direction and moreover there is the disadvantageous possibility that adjacent images overlap.

SUMMARY OF THE INVENTION

Accordingly, it is a principle object of the present invention to provide an improved scanning system which enables one to efficiently allocate reproduction images on the whole range of sheet of photosensitive materials, thus to fully utilize the whole range thereof.

It is a further object of the invention to provide an improved scanning system which enables a determination of which part of the sheet is already exposed and which part is not exposed, not only in the main scanning direction, but also in the sub-scanning direction of a sheet of photosensitive materials.

Other objects of the present invention will be evident from the description hereinafter presented.

Practically, the above objects are attained as in the following way. At first, according to position data (data of trimming start and stop points) of originals to be reproduced and position data (data of recording start and stop points) of corresponding reproduction images being input via input devices, the reproduction images are allocated onto a photosensitive materials. This allocation work is performed by simulating the actual state of the reproduction images on the photosensitive material. Therefore, they never overlap and the interval between adjacent originals is never widened excessively.

Then the position data of the originals and the reproduction images are stored into an external memory such as disc memory as a data file.

After storing the data of respective originals into the external memory, a recording process is carried out by using the filed data (position data) and the image data of the originals. In this process, some of the filed data are input to motor controllers of the input and the output sides and to a magnification ratio setter.

The above and other objects and features of this invention can be appreciated more fully from the following detailed description when read with reference to the accompanying drawings.

PREFERRED EMBODIMENT OF THE INVENTION

Figure 1:
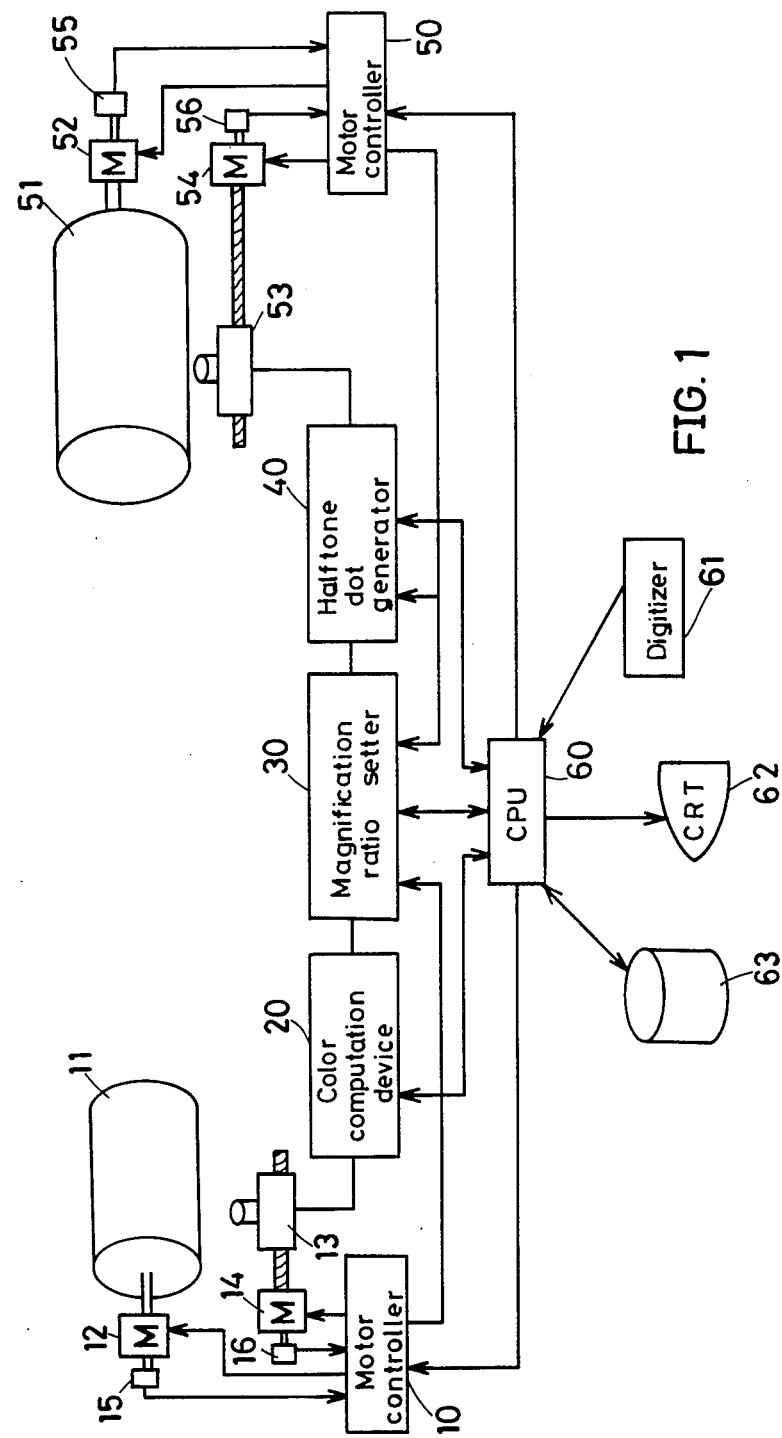
FIG. 1 shows a block diagram of an electro-optical scanning system according to this invention.

Referring to FIG. 1, an input scanning drum 11, on the peripheral surface of which an original or originals is or are mounted, is driven to rotate by a motor 12, while an input scanning head 13 for obtaining image data is driven to traverse on a feed screw in the subscanning direction by a motor 14 and is controlled to proceed at proper speed according to a desired magnification ratio.

The rotating speed of the respective motors 12, 14 is controlled by a motor controller 10, in response to commands from the CPU 60. The rotating speed and the revolution angle of the scanning drum 11 are detected by one-revolution signals and clock pulses generated from a rotary encoder 15 which is coaxially connected to the motor 12, and are controlled by comparing with them. A rotary encoder 16 which is coaxially connected to the motor 14 generates clock pulses and one-revolution signals, which are input to the motor controller 10, by which the position of the scanning head 13 relative to the sub-scanning direction is controlled in response to commands from the CPU 60. The commands from the CPU 60 are given in accordance with desired position and magnification data in regard to images to be recorded.

Color component signals of R (Red), G (Green) and B (Blue) obtained through the input scanning head 13 are input to a color computation circuit 20 to process color correction, gradation correction, sharpness emphasis etc., as in conventional color scanners, and then output as color separation signals of Y (Yellow), M (Magenta), C (Cyan) and K (Black) therefrom.

The color separation signals Y, M, C and K are input to a magnification ratio setter 30, in which these color separation signals are converted to image signals in response to commands from the CPU 60, which the image signals corresponds to a desired magnification relative to the main scanning direction, when the image signals are input to a halftone dot generator 40. Any of magnification ratio setters disclosed in U.S. Pat. Nos. 3,272,918 or 3,541,245, or co-pending U.S. Ser. Nos. 924,928 or 170,127 can be applied to the magnification setter 30. Any of halftone dot generators disclosed in U.S. Pat. No. 3,657,472, or co-pending U.S. Ser. No. 365,890 can be applied to the halftone dot generator 40. In regard to these magnification ratio setter and halftone dot generator, no special explanation is given here because they are not the subject matter of this invention.

On the other hand, controlling in a recording unit is carried out in the same manner as in the scanning unit mentioned as above. That is, a recording drum 51 is driven to rotate by a motor 52, and a recording head 53 for recording reproduction images on a photosensitive material placed on the drum 51 is traversed in the sub-scanning direction along a feed screw by a motor 54. The rotating speed of the respective motors 52, 54 is controlled by a motor controller 50 similarly as mentioned on the scanning unit. The rotating speed and the revolution angle of the recording drum 51 are detected by one-revolution signals and clock pulses generated from a rotary encoder 55 which is coaxially connected to the motor 52, and are controlled by comparing therewith. A rotary encoder 56 which is coaxially connected to the motor 54 generates clock pulses and one-rotation signals, which are input to the motor controller 50, by which the position of the recording head 53 relative to the sub-scanning direction is controlled in response to commands from the CPU 60. The commands from the CPU 60 are given in accordance with desired position and magnification data which are stored in the CPU.

Respective motors 12, 14 and 52 and 54 are controlled by the respective motor controllers 10 and 50 in response to commands from the CPU 60. The rotating speed and the revolution angle of the respective drums 11 and 51 and the position signals relative to the sub-scanning direction of the respective heads 13 and 53 are input via respective motor controller 10 and 50 to the CPU 60, and simultaneously clock pulses and one-rotation signals generated from the respective rotary encoders 12, 14, 55 and 56 are respectively input to the magnification setter 30, whereby both the scanning head 13 and the recording head 53 are respectively controlled to scan respective originals and to record respective images at the desired magnification on a photosensitive material.

Figure 3:
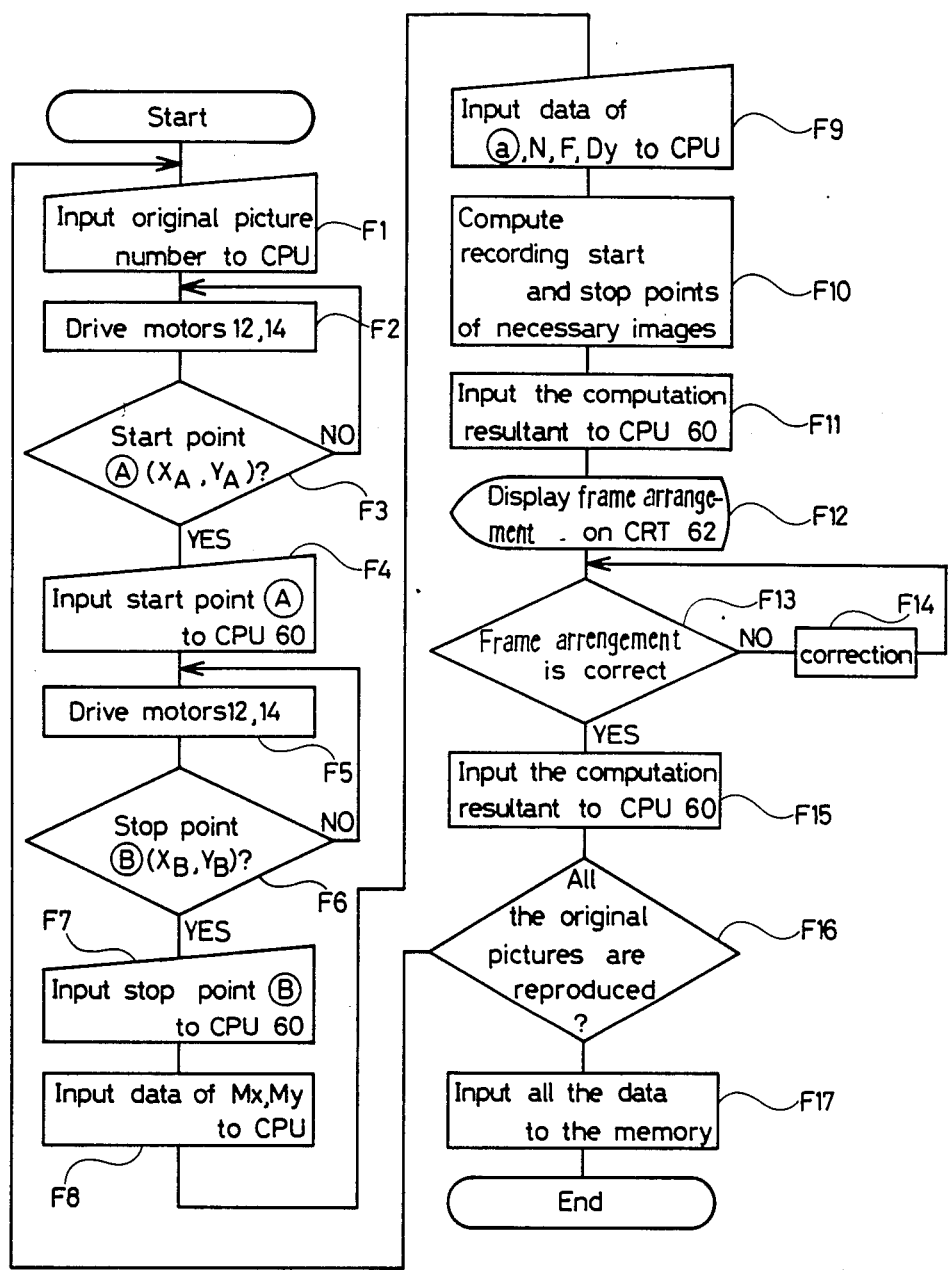
FIG. 3 shows a flow chart for indicating the operations of the system according to the invention.

Referring to FIG. 3, data-input operations are carried out as follows.

At first, the originals Q to be scanned are numbered, and the filing numbers in regard to the originals are input to an internal memory of the CPU 60 by means of a keyboard (not shown) - - - ($F_1$). Then the scanning drum 11 and scanning head 13 are respectively rotated and moved to the upper left-hand corner Ⓐ ($X_A$, $Y_A$) (hereinafter defined as trimming start point) which is on the contour of the desired area T (hereinafter defined as trimming area) in the first original $Q_1$ - - - ($F_2$). At the point that the scanning head 13 coincides with the trimming start point, driving of the respective motors 12 and 14 is stopped, then the coordinate value of the trimming start point Ⓐ ($X_A$, $Y_A$) expressed by the pulses and signals output from the rotary encoders 15 and 16 are input to the internal memory of the CPU 60 - - - ($F_3$)($F_4$). Then the motors 12 and 14 are driven again to rotate the scanning drum 11 and to move the head 13 to the diagonal point of the trimming start point (hereinafter defined as trimming stop point) indicated as Ⓑ - - - ($F_5$). At the point that the scanning head 13 coincides with the trimming stop point, driving of the respective motors 12 and 14 is stopped, then the coordinate value thereof ($X_B$, $Y_B$) is input to the internal memory of the CPU 60 - - - ($F_6$)($F_7$). Data of a desired magnification ratio M ($M_y$: magnification relative to the main scanning direction, $M_x$: magnification relative to the subscanning direction) are input to the internal memory of the CPU 60 - - - ($F_8$). Through the above-mentioned operations the data setting procedure is completed in the scanning unit.

In the recording unit, the coordinate value of a upper left-hand point ⓐ ($X_a$, $Y_a$) (hereinafter defined as recording start point) of the first recording frame, relative to the photosensitive material R, are input, by means of the digitizer 61, to the internal memory of the CPU 60. On the other hand, a "film identifying number" for identifying a color separation image with a corresponding original, a "number of color separation" for indicating how many color separation images of an original should be recorded and intervals ($V_x$: interval relative to the sub-scanning direction, $V_y$: interval relative to the main scanning direction) between respective frames in which respective color separation images are allocated are input, by means of function keys provided on a keyboard associated with a CRT device 62, to the internal memory of the CPU 60 - - - ($F_9$). In response to the data input, the CPU 60 computes and finds the diagonal point ⓑ ($X_b$, $Y_b$) (hereinafter defined as recording stop point) in such a manner as mentioned below. Also with respect to respective succeeding frames, respective recording start points and recording stop points are computed and found by the CPU 60 in such a manner as mentioned below - - - ($F_{10}$).

That is, defining that respective coordinate values of recording start and stop points of the reproduction images are as shown below:

|   | Recording start point | Recording stop point |
|---|---|---|
| Y | $X_{aY}$, $Y_{aY}$ | $X_{bY}$, $Y_{bY}$ |
| M | $X_{aM}$, $Y_{aM}$ | $X_{bM}$, $Y_{bM}$ |
| C | $X_{aC}$, $Y_{aC}$ | $X_{bC}$, $Y_{bC}$ |
| K | $X_{aK}$, $Y_{aK}$ | $X_{bK}$, $Y_{bK}$ | when the coordinate value of the point ($X_{aY}$, $Y_{aY}$) is input as the recording start point with respect to Yellow color separation, the coordinate value of the recording stop point is found from equations:

$$X_{bY} = X_{aY} + S_x \quad (1)$$

$$Y_{bY} = Y_{aY} + S_y \quad (1)'$$

wherein the values $S_x$ and $S_y$ are derived on the basis of coodinate values of the trimming start point and the trimming stop point of the corresponding original $Q_1$, i.e. A $(X_A, Y_A)$, and B $(X_B, Y_B)$, and the magnification ratio data M in such a manner as follows:

$$S_x = (X_A - X_B)M_x \quad (2)$$

$$S_y = (Y_A - Y_B)M_y \quad (2)'$$

The other recording start and stop points with respect to Magenta, Cyan and Black color separation are derived from the following equations:

$$X_{aM} = X_{aY} \quad (3)$$

$$Y_{aM} = Y_{bY} + D_y = Y_{aY} + S_y + D_y \quad (3)'$$

$$X_{bM} = X_{bY} = X_{aY} + S_x \quad (4)$$

$$Y_{bM} = Y_{aM} + S_y = Y_{aY} + 2S_y + D_y \quad (4)'$$

$$X_{aC} = X_{aY} \quad (5)$$

$$Y_{aC} = Y_{bM} + D_y = Y_{aY} + 2S_y + 2D_y \quad (5)'$$

$$X_{bC} = X_{bY} = X_{aY} + S_x \quad (6)$$

$$Y_{bC} = Y_{aC} + S_y = Y_{aY} + 3S_y + 2D_y \quad (6)'$$

$$X_{aK} = X_{aY} \quad (7)$$

$$Y_{aK} = Y_{bC} + D_y = Y_{aY} + 3S_y + 3D_y \quad (7)'$$

$$X_{bK} = X_{bY} = X_{aY} + S_x \quad (8)$$

$$Y_{bK} = Y_{aK} + S_y = Y_{aY} + 4S_y + 3D_y \quad (8)'$$

Thus obtained recording start and stop points of frames in which color separation images are recorded are temporarily stored into the internal memory of the CPU 60 - - - ($F_{11}$).

After that, the arrangement of image frames cooresponding to the first original $Q_1$ is displayed on CRT device 62 - - - ($F_{12}$). Thus an operator can find the frame arrangement relative to the photosensitive material and, if necessary, correct the arrangement by referring to the simulation image on the CRT device 62 - - - ($F_{13}$)($F_{14}$). When the frame arrangement of color separation images in respect to the first original is settled, these data are stored into the external memory, e.g. a disk memory device 63 - - - ($F_{15}$).

Figure 2:
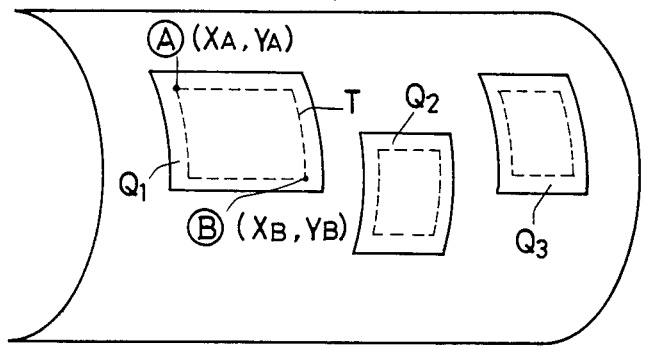
FIG. 2 shows an explanatory view for embodying this invention in allocating reproduction images onto a photosensitive material.
Figure 2:
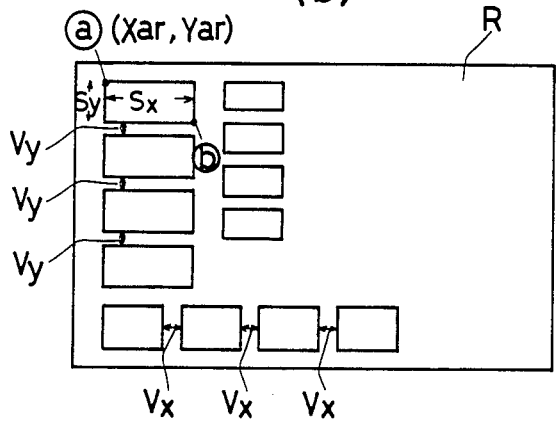
Figure 2:
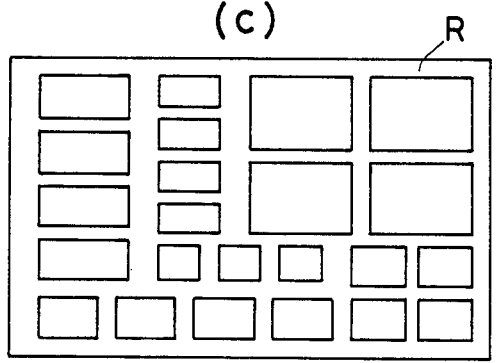

With respect to the other originals the above procedure is repeated to memorize frame data of corresponding respective originals - - - ($F_{16}$). In this case, as the already-settled frame arrangement is displayed on the CRT device 63 as shown in FIG. 2(b), the frame arrangement of the following originals can easily be carried out in the vacant places by simulating the undertaking frame arrangement. In such a manner as mentioned above, all the position data of imaged frames are stored in the external memory 63 - - - ($F_{17}$).

Although the above description is directed to the case that four color separation frames for Yellow, Magenta, Cyan and Black with respect to an original are alligned in the main scanning direction on a photosensitive material successively, it can also be applicable to record them by ones, by twos or by threes with respect to an original in compliance with the magnification ratio M. That is, for example, when only one image frame or two image frames of the four color separation images Y, M, C and K is or are intended to allocate on a photosensitive material due to high magnification, an instruction is input in the step F9, by which necessary data for carrying out such frame allocation is derived from the above equations.

It is also possible to find whether a color separation image or images is or are within the whole area of the photosensitive material, by merely inputting the size data of the photosensitive material in the step F9. That is, assuming that the coordinate value of the start point in regard to a color separation frame is $(X_{a1}, Y_{a1})$ and that of the recording stop point is $(X_{a2}, Y_{a2})$, which are respectively derived from the equations as mentioned above, and the size data of a photosensitive material is $S_{FX}$ in X-direction and $S_{FY}$ in Y-direction, the reproduction image is not within the whole area of the photosensitive material when $X_{a2} > S_{FX}$ or $Y_{a2} > S_{FY}$. In such a case an error sign is displayed on the CRT device.

Figure 4:
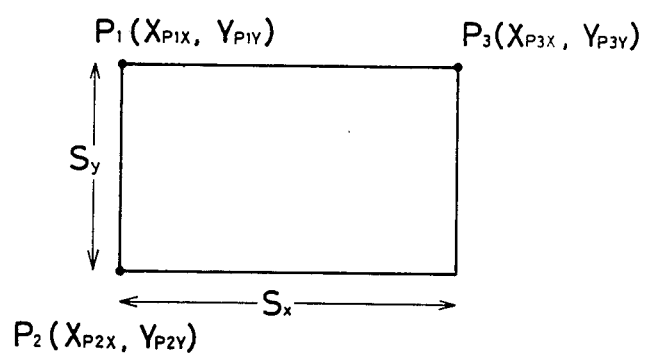
FIG. 4 shows an explanatory view for explaining the way to obtain a desired magnification.

There is another method to obtain the magnification data, instead of inputting them in the step F9. Referring to FIG. 4, the coordinate values of the point $P_2$ ($X_{P2X}$, $Y_{P2Y}$) and the point $P_3$ ($X_{P3X}$, $Y_{P3Y}$) as well as the recording start point $P_1$ ($X_{P1X}$, $Y_{P1Y}$) are input by the digitizer 61 to the CPU 60, whereby the value $S_x$ and the value $S_y$ which respectively represent the longitudinal length and the lateral length of a reproduction image are obtained from the equations:

$$S_X = \overline{X_{P1X}, X_{P3X}}$$

$$S_Y = \overline{Y_{P1Y}, Y_{P2Y}}$$

Then the magnification data ($M_X$, $M_Y$) can be found inversely from the value ($S_X$, $S_Y$), the coordinate value of the trimming start point and that of the trimming stop point.

Table 1 shows a data file of an original obtained in such a manner as mentioned above, in which the "film identifying number" indicated as $F_Y$, $F_M$, $F_C$ and $F_K$ identifies a color separation image with a corresponding original, and is helpful for an operator when respective color separation images with respect to an original are recorded on several photosensitive materials. "Flags", indicated as $FLG_Y$, $FLG_M$, $FLG_C$ and $FLG_K$, are used to indicate whether or not a reproduction image is already recorded, and are respectively cleared to "0" when data is input at the step (F9), and are respectively set to "1" when an exposure is made, which is automatically performed by the CPU 60.

Incidentally, "condition data" shown in Table 1 contains data to be set in the color computation circuit 20 and being requisite for color separation, however, no explanation is given here since it is not the subject matter of this invention.

Figure 5:
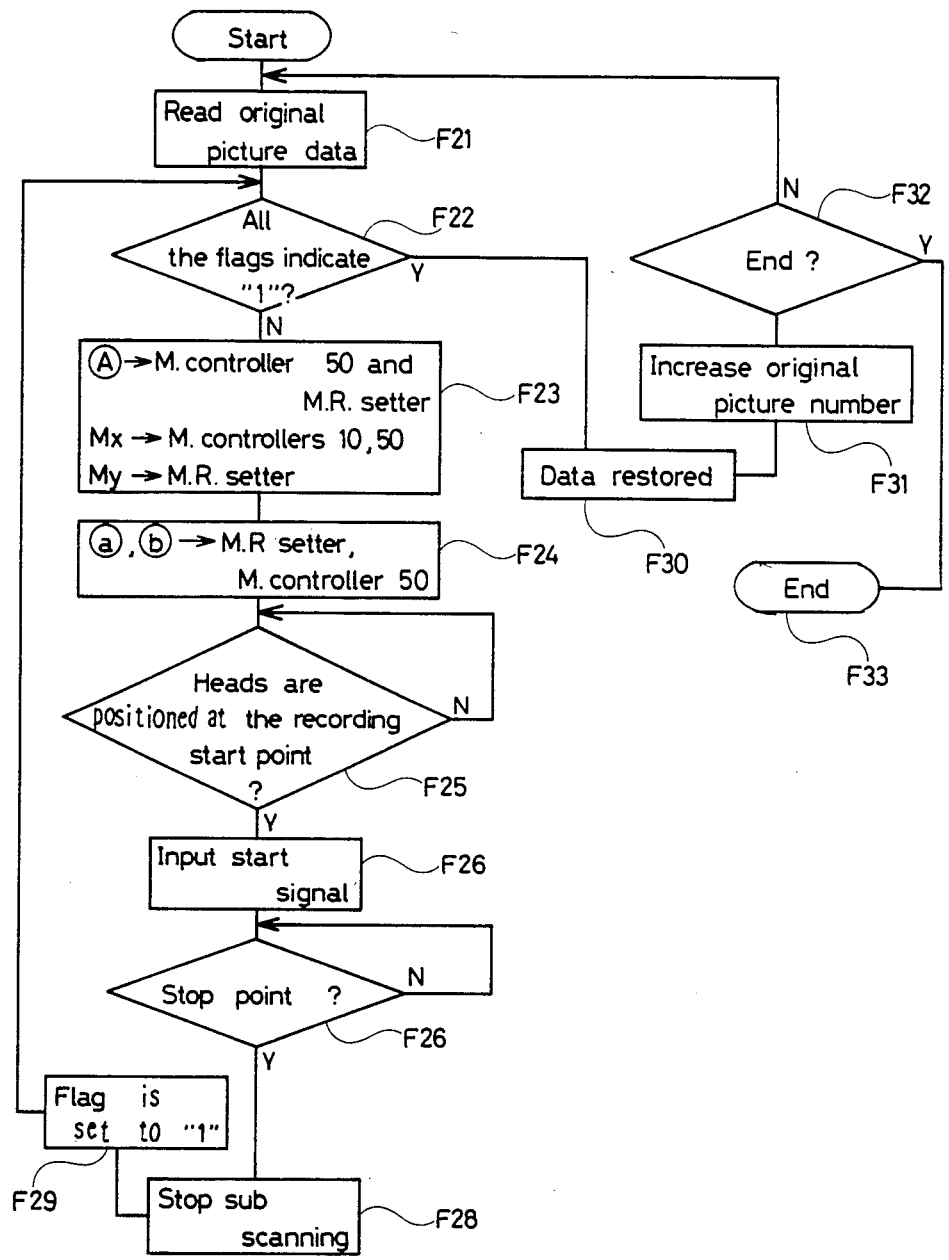
FIG. 5 shows a flow chart for indicating the operations in a control unit of this invention.

When the above-mentioned data input operations are completed, an operator operates the function keys of the keyboard (previously mentioned but not shown) attached to the CRT device 62 to input to the CPU 60 a command for starting the recording operations. Input to the CPU 60 may also be via digitizer 61. Then the CPU 60 controls respective devices 10, 20, 30, 40 and 50 shown in FIG. 1 in such a manner as shown in the flow chart of FIG. 5, which is described hereunder.

TABLE 1

| Original number | | No. |
|---|---|---|
| trimming | start point | $(X_A, Y_A)$ |
| | stop point | $(X_B, Y_B)$ |
| Magnification | X direction | $M_X$ |
| ratio | Y direction | $M_Y$ |
| Yellow | film identifying number | $F_Y$ |
| color | number of color separation | $N_Y$ |
| separation | recording start point | $(X_{AY}, Y_{AY})$ |
| | recording end point | $(X_{BY}, Y_{BY})$ |
| | flag | $FLG_Y$ |
| Magneta | film identifying number | $F_M$ |
| color | number of color separation | $N_M$ |
| separation | recording start point | $(X_{AM}, Y_{AM})$ |
| | recording end point | $(X_{BM}, Y_{BM})$ |
| | flag | $FLG_M$ |
| Cyan | film identifying number | $F_C$ |
| color | number of color separation | $N_C$ |
| separation | recording start point | $(X_{AC}, Y_{AC})$ |
| | recording end point | $(X_{BC}, Y_{BC})$ |
| | flag | $FLG_C$ |
| Black | film identifying number | $F_K$ |
| color | number of color separation | $N_K$ |
| separation | recording start point | $(X_{AK}, Y_{AK})$ |
| | recording end point | $(X_{BK}, Y_{BK})$ |
| | flag | $FLG_K$ |
| Intervals in X-direction | | $V_x$ |
| Intervals in Y-direction | | $V_y$ |
| Condition data | | ( ) |

At first, the data with respect to the first original are read from the external memory 63 - - - ($F_{21}$), and the "flags" are examined - - - ($F_{22}$).

When at least one of the respective "flags" indicates "0", which means that the reproduction image is not recorded, thus coordinate values of both the trimming start point and the trimming stop point with respect to the corresponding original are input to both the motor controller 10 and the magnification ratio setter 30. While the magnification ratio data $M_x$ and $M_y$ are input respectively to the motor controllers 10 and 50 and to the magnification ratio setter 30 - - - ($F_{23}$). Then the data of the "number of color separation" are examined to determine which separation mode is done, e.g. by one colors, by two colors, by three colors or by four colors from an original, and to input the separation mode to the magnification ratio setter 30. And the coordinate values of both the recording start point and the recording stop point are input both to the magnification ratio setter 30 and to the motor controller 50 - - - ($F_{24}$). The scanning head 13 and the recording head 53 are respectively positioned at the scanning start point and at the recording start point in response to signals respectively from the motor controllers 10 and 50, which respectively output signals of readiness to the CPU 60 - - - ($F_{25}$). In response to the readiness signals, the CPU 60 outputs command signals to operate the motor controllers 10 and 50, to the magnification ratio setter 30 and to the halftone dot generator 40 - - - ($F_{26}$). When respective heads 13 and 53 reach respective stop points, the CPU 60 receives stop signals from both the motor controllers 10 and 50, and stops the respective heads. In response to the stop signals, the CPU 60 commands both the magnification ratio setter 30 and the halftone dot generator 40 to stop respective operations - - - ($F_{28}$), and make the "flag" set to "1" - - - ($F_{29}$). When the flag is set to "1", the image frame corresponding to the color separation is distinguished from image frames which are not exposed, i.e. whose flags are indicated as "0". In this case, an exposed image frame is successively brightened on the CRT device. Thus an operator can easily find the recording procedure. After that, steps $F_{22}$ to $F_{29}$ mentioned above are repeated with respect to the other color separation images of the original. When the flags of all the color separation images indicate "1" ($FLG_Y=1$, $FLG_M=1$, $FLG_C=1$ and $FLG_K=1$), the data of the corresponding original are restored into the external memory 63 from the CPU 60 - - - ($F_{30}$).

In such a manner as mentioned above, all the operations with respect to the first original are completed, and after that, the data concerning the second original are read out from the memory 63 - - - ($F_{31}$)-($F_{32}$), then the steps $F_{21}$ to $F_{29}$ are repeated in the same manner as above. These operations are repeated with respect to the remaining originals, then the recording operations with regard to all the originals are completed - - - ($F_{32}$)-($F_{33}$).

Although the above-mentioned embodiment only shows a case that four color separation images are arranged and recorded in the main scanning direction, it may be easily understood that color separation images can be arranged and recorded in the sub-scanning direction or in matrix as shown in FIG. 2(c). Thus the above description enables any person skilled in the art to which this invention pertains.

As is mentioned above, since the system of this invention is capable of allocating reproduction images of an original an originals onto a photosensitive material while observing the simulation on a CRT device and by means of an input device such as a digitizer before carrying out actual recording work, adjacent two reproduction images never overlap or the intervals therebetween never be excessively widened. Furthermore, the recording operations are carried out automatically by means of control devices without inputting the recording data every original. Further the system enables to use the whole surface of a photosensitive material which is of relatively large size efficiently and effectively.

I claim:

1. In a method for reproducing an original image using a color separation technique including reproduction of a plurality of recorded images corresponding to the original image, the improvement comprising the steps of:
   creating a data base file including a plurality of records respectively identifying and corresponding to various images to be recorded, and
   including a flag in each record to indicate whether or not the image corresponding to the record has been recorded.

2. An improved method for reproducing an original image as recited in claim 1, wherein said step of creating comprises the further steps of supplying for the data base records data identifying coordinate values defining an area of the original image to be reproduced, data identifying a magnification ratio for the original image, data defining a number of color separation images to be reproduced, data identifying a coordinate value of at least one of a recording start point and a recording stop point for a reproduced image, and data defining an interval between adjacent reproduced images,
   wherein positions of the recorded images are determined prior to recording of the images.

3. An improved method for reproducing an original image as recited in claim 2, comprising the further step of computing positions of the original image and of the recorded images from the corresponding records of the data base, thereby controlling scanning of the original, positioning and recording of the recorded images based on data provided prior to scanning of the original.

4. An improved method for reproducing an original image as recited in claim 1, comprising the further step of reproducing a plurality of color separation images of the original image by:
   inputting a command for starting recording operations,
   reading image data for the original image from an external memory storing the data base files,
   testing the flag of the record of each color separation image for the original image, and
   if at least one flag indicates that the corresponding color separation image has not been recorded, proceeding with the recording operations.

5. An improved method for reproducing an original image as recited in claim 4, wherein said proceeding step comprises the steps of inputting to a motor controller and to a magnification ratio setter coordinate values for trimming start and stop points for the original image,
   testing data in the records of the data base identifying a number of color separations to be recorded,
   positioning a scanning head and a recording head at a scanning start point and at a recording start point, respectively, and
   operating the magnification ratio setter and a halftone dot generator to record an appropriately magnified color separation image of the original image.

* * * * *